US009127565B2

(12) United States Patent
Keller et al.

(10) Patent No.: US 9,127,565 B2
(45) Date of Patent: Sep. 8, 2015

(54) APPARATUS COMPRISING A CMC-COMPRISING BODY AND COMPLIANT POROUS ELEMENT PRELOADED WITHIN AN OUTER METAL SHELL

(75) Inventors: Douglas A. Keller, Kalamazoo, MI (US); Jay A. Morrison, Oviedo, FL (US); Malberto Gonzalez, Orlando, FL (US); David C. Radonovich, Winter Park, FL (US)

(73) Assignee: Siemens Energy, Inc., Orlando, FL (US)

( * ) Notice: Subject to any disclaimer, the term of this patent is extended or adjusted under 35 U.S.C. 154(b) by 2275 days.

(21) Appl. No.: 12/104,049

(22) Filed: Apr. 16, 2008

(65) Prior Publication Data

US 2009/0260364 A1 Oct. 22, 2009

(51) Int. Cl.

*F02C 1/00* (2006.01)
*F02C 7/20* (2006.01)
*F01D 25/00* (2006.01)
*F01D 9/02* (2006.01)
*F23M 5/00* (2006.01)
*F23R 3/00* (2006.01)

(52) U.S. Cl.

CPC .............. *F01D 25/005* (2013.01); *F01D 9/023* (2013.01); *F23M 5/00* (2013.01); *F23R 3/002* (2013.01); *F05D 2300/21* (2013.01); *F23M 2900/05004* (2013.01); *F23R 2900/00017* (2013.01); *F23R 2900/03041* (2013.01); *F23R 2900/03042* (2013.01)

(58) Field of Classification Search

USPC .................................................... 60/753, 800
See application file for complete search history.

(56) References Cited

U.S. PATENT DOCUMENTS

| | | | | |
|---|---|---|---|---|
| 3,134,084 | A * | 5/1964 | Shriro | 338/162 |
| 4,818,497 | A * | 4/1989 | Andersson et al. | 422/179 |
| 6,013,592 | A | 1/2000 | Merrill et al. | |
| 6,182,451 | B1 * | 2/2001 | Hadder | 60/732 |
| 6,197,424 | B1 | 3/2001 | Morrison et al. | |
| 6,235,370 | B1 | 5/2001 | Merrill et al. | |
| 6,287,511 | B1 | 9/2001 | Merrill et al. | |
| 6,397,603 | B1 | 6/2002 | Edmondson et al. | |
| 6,571,560 | B2 | 6/2003 | Tatsumi et al. | |
| 6,655,148 | B2 * | 12/2003 | Calvez et al. | 60/753 |
| 6,733,907 | B2 | 5/2004 | Morrison et al. | |
| 6,767,659 | B1 | 7/2004 | Campbell | |
| 6,932,566 | B2 | 8/2005 | Suzumura et al. | |
| 7,093,359 | B2 | 8/2006 | Morrison et al. | |
| 7,117,983 | B2 | 10/2006 | Good et al. | |
| 7,555,906 | B2 * | 7/2009 | Anichini et al. | 60/799 |
| 7,647,779 | B2 * | 1/2010 | Shi et al. | 60/800 |
| 7,762,076 | B2 * | 7/2010 | Shi et al. | 60/753 |
| 2008/0110175 | A1 * | 5/2008 | Graham | 60/753 |

* cited by examiner

*Primary Examiner* — Ehud Gartenberg
*Assistant Examiner* — Arun Goyal

(57) ABSTRACT

An apparatus includes a metal shell (200, 300) surrounding a body (230, 330) that is made of a ceramic matrix composite (CMC) material (231) The metal shell defines a space (250) adapted to contain the body and includes at least one protrusion (220) adapted to contact the body. A compliant porous element (240) is adapted to fit in the space between the metal shell and the body. A preload spring (260, 360) is provided in an urging orientation with the body wherein the preload spring is positioned against a first region (333) of the body and is adapted to urge the body toward one of the protrusions positioned against a second region (335) generally opposite the first region, and also to preload the compliant porous element. One of the protrusions may be a hard stop, and in the preload, one of the protrusions may be loaded.

8 Claims, 7 Drawing Sheets

APPARATUS COMPRISING A CMC-COMPRISING BODY AND COMPLIANT POROUS ELEMENT PRELOADED WITHIN AN OUTER METAL SHELL

FIELD OF THE INVENTION

The present invention relates generally to an apparatus for a gas turbine that includes an inner body, comprising a ceramic matrix composite (CMC) that is positioned in preloading arrangement with a compliant porous element disposed within an outer shell comprising metal. The inner body may additionally comprise a ceramic insulating layer.

BACKGROUND OF THE INVENTION

Engine components that are exposed to the hot combustion gas flow of modern combustion turbines are required to operate at ever-increasing temperatures as engine efficiency requirements continue to advance. Ceramics typically have higher heat tolerance and lower thermal conductivities than metals. For this reason, ceramics have been used both as structural materials in place of metallic materials and as coatings for both metal and ceramic structures, Ceramic matrix composite (CMC) wall structures with ceramic insulation outer coatings, such as described in commonly assigned U.S. Pat. No. 6,197,424, have been developed to provide components with the high temperature stability of ceramics without the brittleness of monolithic ceramics.

Even though less brittle than monolithic ceramics, CMC-comprising structures nonetheless are less able to withstand certain mechanical loads compared with metal structures, and also have a substantially lower thermal expansion than metal structures. This has lead to a number of approaches to better facilitate the use of CMC-comprising structures in gas turbine apparatuses.

For example, U.S. Pat. No. 6,397,603 teaches a combustor having liners made from CMCs that are used in conjunction with superalloy-comprising mating materials. Specific metallic forward cowls and aft seals are described that support the CMC liner without stressing the liner due to thermal expansion.

Regarding a gas turbine bucket shroud that surrounds a turbine blade, U.S. Pat. No. 7,117,983 describes an arrangement that comprises a spring mass damper that applies a load to the back side of a ceramic component that also is attached to an outer shroud block at its forward and rearward ends by securing respective forward and aft flanges to the outer shroud block. U.S. Pat. No. 6,932,566 discloses another approach for arranging a ceramic shroud segment (or ring segment) that uses a spring between the shroud segment and a more outwardly disposed shroud support component. The forward and aft ends of the ceramic component each comprise a groove into which a respective tongue of the shroud support inserts. The arrangement of elements is stated to prevent high thermal stress that could otherwise be generated by the thermal expansion difference in the axial and radial directions of the shroud segment, as well as the spring allowing for radial expansion differences. Specific methods of fabrication of the ceramic shroud segment also are disclosed.

U.S. Pat. No. 6,571,560 discloses ceramic members that form a transition and are supported by metallic support members via elastic support members. Disclosed for some embodiments are protrusions and recesses, such as on the support members and ceramic members, which are stated to provide for correct positional relation with respect to circumferential and radial directions. The elastic support members, such as springs, are arranged to provide for thermal expansion in the flowing direction of the combustion gas. In the arrangements disclosed, the ceramic members remain suspended between end support members without substantial support along their lengths.

Notwithstanding these advances and different approaches, further improvements in the design of apparatuses comprising CMC-comprising bodies are desired to support further applications of such apparatuses in gas turbine engines, particularly in those engines in which an increase in the firing temperatures is expected and/or greater loads are imposed on the transition.

BRIEF DESCRIPTION OF THE DRAWINGS

The invention is explained in the following description in view of the drawings that show.

DETAILED DESCRIPTION OF THE INVENTION

The present invention is directed to an apparatus for use in an industrial or an aeronautical gas turbine engine wherein the apparatus requires less cooling than equivalent metal designs of the particular apparatus. This may improve engine performance, not only due to increased efficiency but also by allowing higher combustion temperatures, and may also improve emissions. Embodiments of the present invention comprise an outer full metal jacket, or shell, in which is positioned a ceramic body covered at least in part by a compliant porous element that is preloaded by a preload element such as a spring, having a predetermined spring constant, referred to herein as a preload spring, wherein the outer metal shell also comprises protrusions extending inward toward the ceramic body. The protrusions are load limiters that assure the compliant porous element, also having a predetermined spring constant, does not get over-displaced by the loading, while the compliant porous element fulfills a load sharing function to provide a distributed support to the ceramic body. That is, in various embodiments there is provided at least one preload element, having a first spring constant, that preloads a region of the compliant porous element, having a second spring constant, where protrusion(s) are disposed to limit the extent of the preload and/or the ultimate operational load. Thus, the invention provides an outer metal shell that is a stress member that may be exposed to high pressure within which is a ceramic body that is a thermal member that is exposed to a lower pressure and which is supported structurally through a preloaded compliant porous member positioned there between.

The invention may find applications in advanced gas turbine engines in which a transition is modified so as to allow for elimination of the first vanes of the turbine, such as by imposing a curvature in the transition to direct the hot gas flow circumferentially. In such applications there is a relatively large increase, such as a five-fold increase, in the pressure difference between the inside and outside of the transition that may nonetheless be accommodated by practicing the teachings of the present invention. In such cases it becomes important to address and resolve pressure load differences on an interior CMC-comprising ceramic body such as by embodiments taught herein.

It is noted that some embodiments may have one or more of the protrusions contacting the ceramic body in the preload condition. Also, the various embodiments allow for relatively unstressed differential thermal expansion and the preloading may be utilized to accommodate a torque based on gas flow through the apparatus while still allowing for differential thermal expansion.

Figure 1:
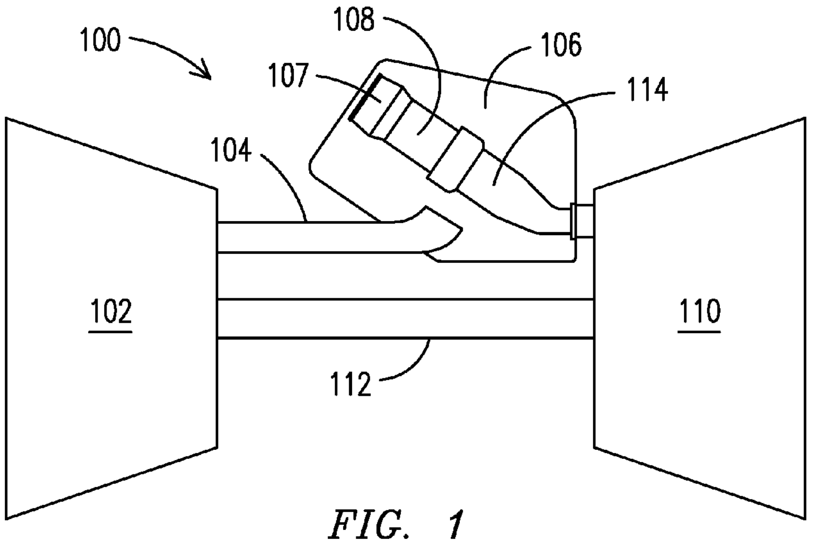
FIG. 1 (PRIOR ART)
FIG. 1 is a schematic depiction showing the major components of a modern gas turbine engine, showing the position of the transition between a combustion chamber and a turbine.

Features of the invention may be appreciated by reference to the appended figures, which are meant to be exemplary and not limiting. Also, the examples provided below are for a gas turbine engine transition, but this is not meant to be limiting as to the types of components that may utilize the teachings of the present invention. The present invention may also find use in the manufacture of combustor liners, interstage turbine ducts, blade tip seal rings, and other gas turbine engine components, Prior to presentation of specific embodiments of the invention, however, a discussion is provided of a common arrangement of elements of a prior art gas turbine engine into which may be provided embodiments of the present invention. FIG. 1 provides a schematic cross-sectional depiction of a prior art gas turbine engine 100 such as may be improved with various embodiments of the present invention. The gas turbine engine 100 comprises a compressor 102, a combustor 107, and a turbine 110. During operation, in axial flow series, compressor 102 takes in air and provides compressed air to a diffuser 104, which passes the compressed air to a plenum 106 through which the compressed air passes to the combustor 107, which mixes the compressed air with fuel in a burner. Combustion occurs in a combustion chamber 108 downstream of the combustor 107. Further downstream combusted gases are passed via a transition 114 to the turbine 110, where the energy of combustion is extracted as shaft power. A shaft 112 is shown connecting the turbine to drive the compressor 102, and may also be connected to an electrical generator (not shown).

As may be appreciated, a transition such as the transition 114 of FIG. 1 is exposed to structural and thermal stresses based on its position immediately downstream of the combustor 107 and the desire to operate turbines at the highest feasible temperature range. Also, as noted above, some transition designs, for instance those that allow for the elimination of the first row of turbine blades, experience higher outside (plenum)-to-inside (hot gas passage) pressure differences. As is demonstrated by the following examples, all of these stresses are well-accommodated by the present invention.

Figure 2D:
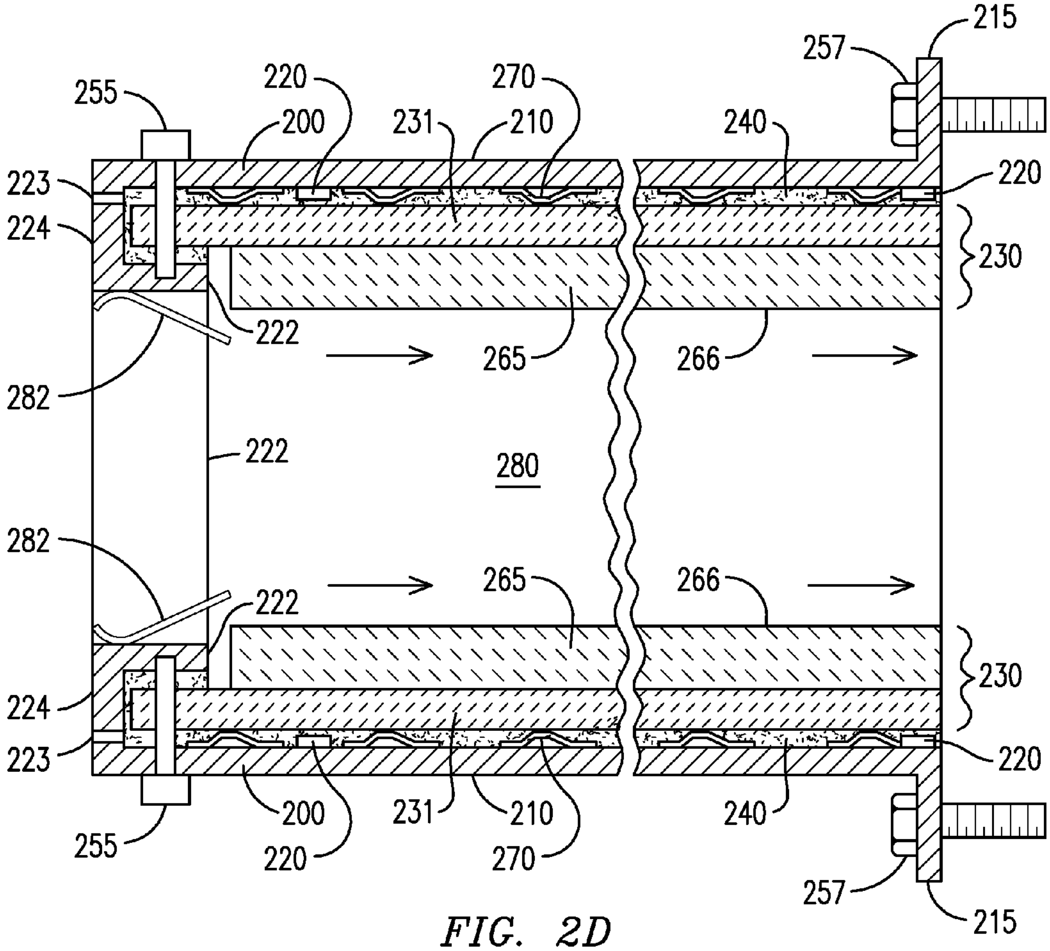
FIG. 2D provides a partial cross-sectional view, of the ends, of the transition of FIG. 2C taken along line 2D-2D.
Figure 2A:
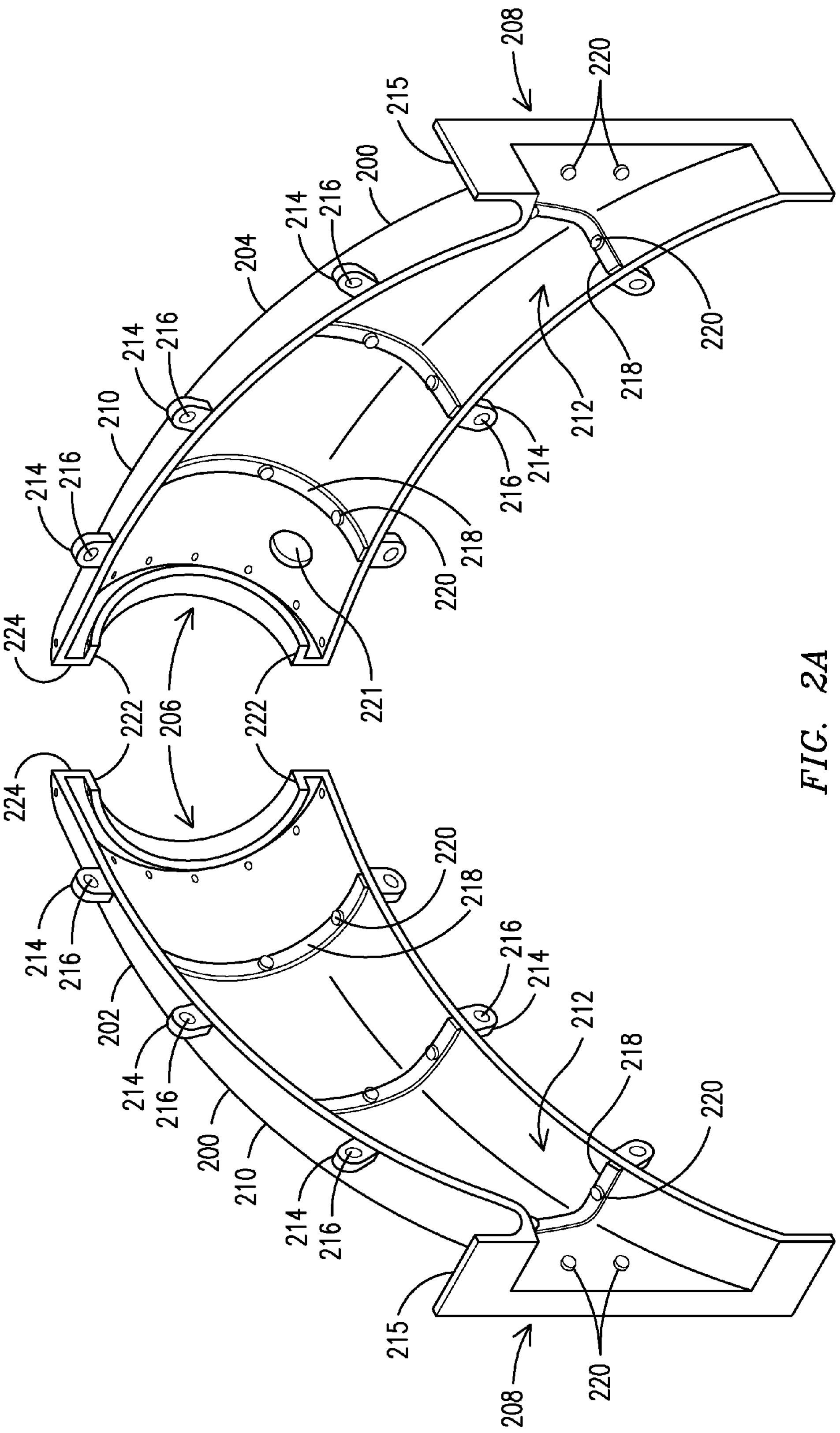
FIG. 2A is a perspective view of a two-part split shell used in some embodiments of the present invention.

FIG. 2A is a perspective view of a two-part split shell 200 used in some embodiments of the present invention. The split shell 200 comprises a first part 202 and a second part 204 that when joined together define a space adapted to contain a transition body (see FIG. 2B). Each of the first part 202 and the second part 204 comprises a forward end 206, an aft end 208, an external surface 210 and an internal surface 212. Spaced apart flanges 214 comprising holes 216 are provided to attach the two parts 202 and 204 together, such as by bolts and nuts (see FIG. 2B). Also viewable along the inside surfaces 212 are optional internal ribs 218 that may provide a desired structural strength (in other embodiments ribs may be external). The internal ribs 218 may comprise protrusions 220; such protrusions 220 may alternatively or additionally be provided independently of the ribs 218.

Figure 2B:
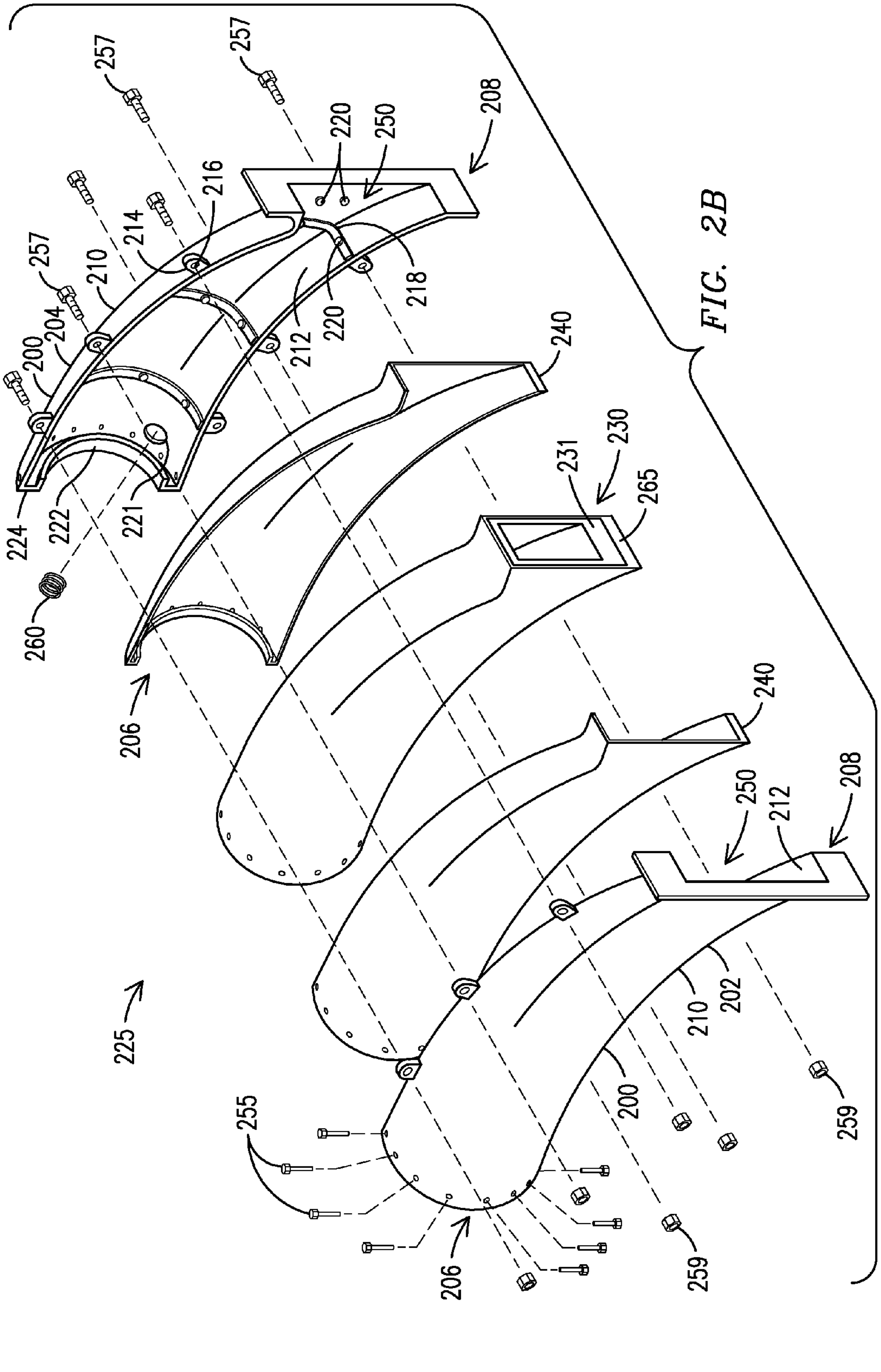
FIG. 2B is a perspective exploded view of a transition of the present invention comprising a CMC-comprising ceramic transition body, a metal shell identical to the one depicted in FIG. 2A, and an intermediately disposed compliant porous element.
Figure 2C:
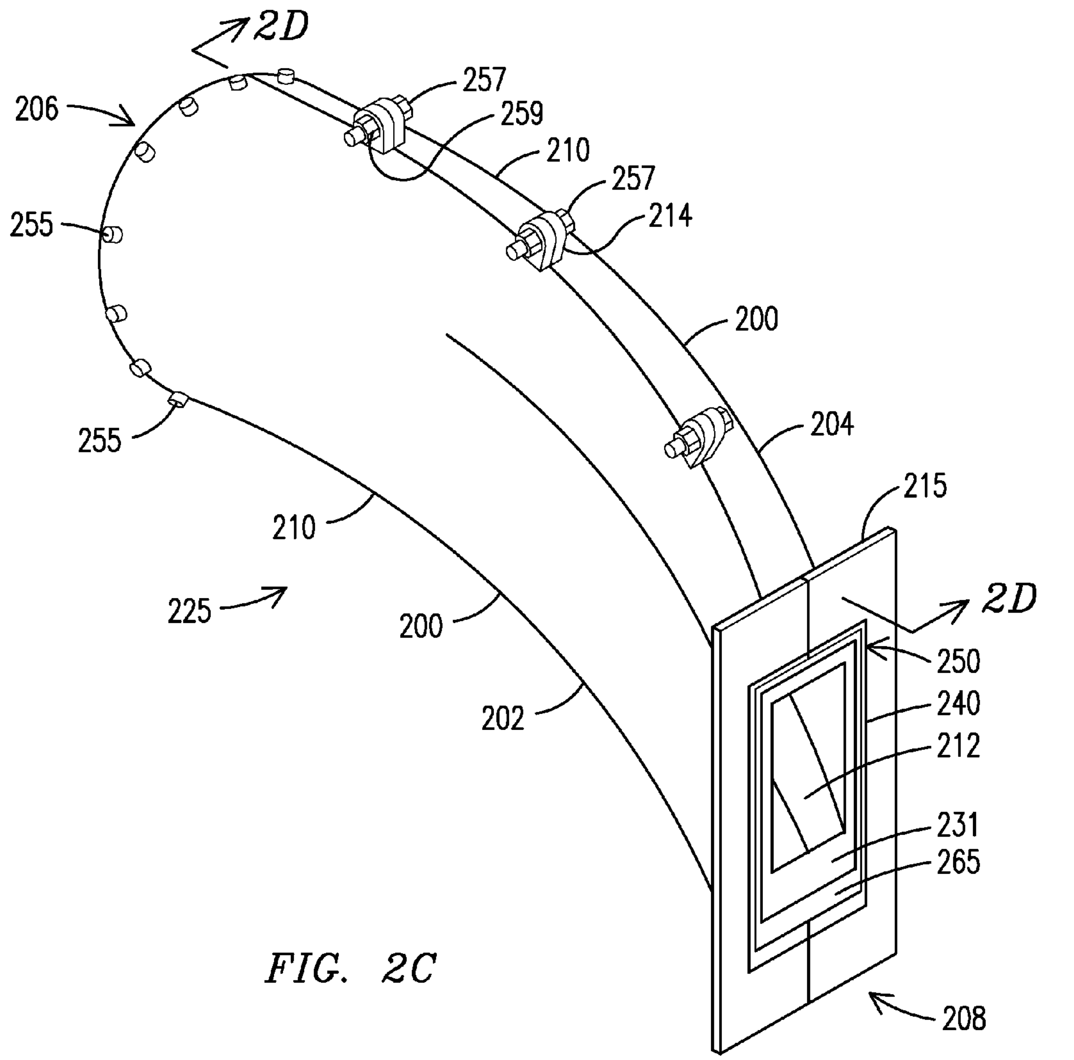
FIG. 2C provides a side perspective view of the assembled transition of FIG. 2B.
Figure 2E:
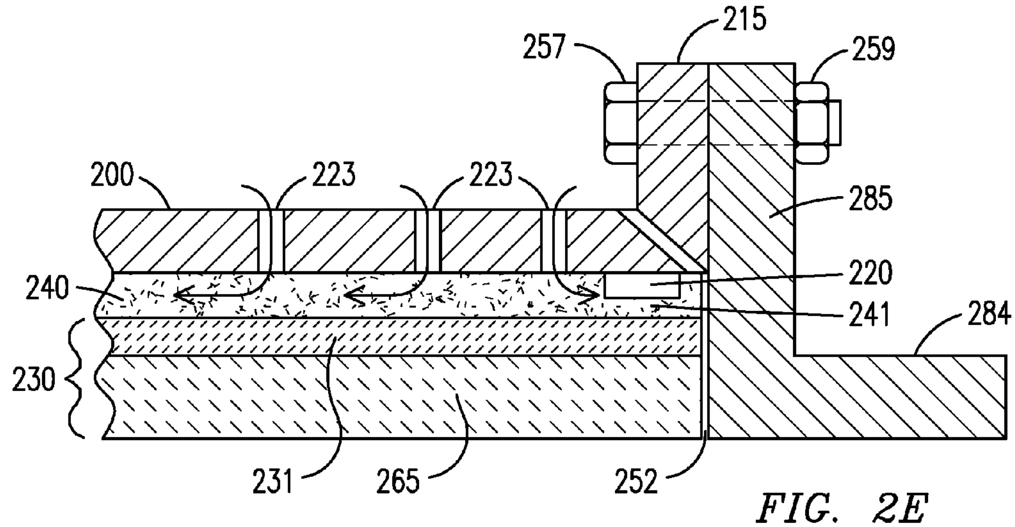
FIG. 2E provides a cross-sectional view of a rear portion of an embodiment of the present invention and certain features of its relationship to a turbine front end to which it may be attached.

The forward ends 206 are adapted to attach to a combustion chamber (not shown, see FIGS. 1 and 2D) and the aft ends 208 are adapted to attach to a turbine inlet (not shown, see FIGS. 1 and 2E). These ends may have any shape to accommodate the attachment and desired flow of hot gas. It is appreciated that a transition typically changes from a generally round shape at its forward end 206 to a shape of a segment of an annular section at its aft end 208, and the latter, for relatively large diameter annular sections, approximates a rectangle. An optional spring seat 221 is shown; this receives a preload spring (not shown, see FIGS. 2B and 3) and helps maintains the preload spring's desired orientation to achieve a desired preloading to a predetermined region.

The two-part split shell is one option of "split shell," meaning that the shell comprises two or more parts that are assembled together, such as by bolting, and that may be disassembled by a reverse process. It is noted that embodiments of the invention alternatively may comprise a single-piece shell, such as one that would be assembled over a transition body and made integral, such as by welding.

FIG. 2B is an exploded view of a transition 225 of the present invention comprising a CMC-comprising ceramic transition body 230 and metal shell first part 202 and second part 204 such as that of FIG. 2A into which is fit the transition body 230. The transition body 230 in its simplest form comprises a CMC-comprising structure 231 that may be manufactured using any of the known CMC fabrication methods, such as fabric layup, filament winding, braiding, use of three-dimensional fabric, and so forth, as is known to those skilled in the art of CMC fabrication. If an oxide CMC is used and the operating temperature requires it, a thermal protection coating may be applied inside of the transition body 230. One example of a thermal protection coating is a ceramic insulating layer. A ceramic insulating layer, commonly referred to as friable grade insulation (FGI), is disclosed in commonly assigned U.S. Pat. No. 6,197,424, which is incorporated by reference for this teaching, including its binding to a CMC lamellate wall, and for the teaching of formation of the CMC lamellate wall.

The transition body 230 comprises an external surface, an internal surface (which as noted above may be covered with optional ceramic insulating layer 265 or other type of thermal protection coating), a forward end and an aft end. A compliant porous element 240 is disposed between the external surface 232 of the transition body 230 and the internal surfaces 212 of the parts 202 and 204 of the metal split shell 200. The compliant porous element 240 can be any one of, or a combination of, felt metal, metal fiber pad, knitted wire material springs, and ceramic felt filler (which may be a weave or a mat, or other type). Each compliant porous element has a predetermined spring constant, k, defined in unit force per distance. A high spring constant provides a relatively stiffer spring, which may be required for higher pressure loaded components or thinner-walled CMC shells requiring greater support. The compliant porous element can also be comprised of individual spring elements uniformly dispersed to provide compliant support and damping along the full length and circumference of the component. Such individual compliant porous elements may include wave springs, leaf springs, or intermittent patches of the above-referenced porous materials utilizable for a compliant porous element. Also, although shown in two sections, the compliant porous element 240 may be formed and supplied as a single section that is slid or otherwise applied between the metal split shell 200 and the transition body 230.

A space 250 is defined by the internal surfaces 212 of the first part 202 and the second part 204 when these parts 202 and 204 are matingly assembled together, such as by bolting through the holes 216.

Generally, the preload elements are adapted to exert a greater force per unit area that the compliant porous elements. In various embodiments the preload elements may be affixed or attached as desired to one of the other components of the apparatus in an operational relationship. In this example a preload element in the form of a single preload spring 260 is depicted for seating into the spring seat 221. The transition 225 is designed so that at least one of the one or more preload springs 260, based on positioning and a predetermined spring constant, preloads one or more regions of the compliant porous element 240, also having a predetermined spring constant, to a desired, predetermined level. This preload relationship is based on the force applied by the one or more preload springs, such as 260, when the assembly of the transition 225 is completed but before apparatus operations begin.

In some embodiments, this is achieved whilst the protrusions 220 are not in contact with the transition body 230 (nor, in some embodiments, under a load from the preloading springs). In other embodiments, at least one of the protrusions 220 is in contact with the transition body 230 (and, in some embodiments, also under a load from the preloading springs). In various embodiments, a protrusion may have a specified degree of flexibility, such as when comprised of a thickened, compressed, and/or protruding section of one or more of the materials utilized for the compliant porous element, or a protrusion may be without appreciable flexibility in the vector of loading, such as a metallic hard stop. Also, it is appreciated that, generally, depending on the design and arrangement of elements, materials that are utilized to form a compliant porous element, such as felt metal, metal fiber pad, knitted wire material springs, and ceramic felt filler, springs and combinations of these, may be used for form a preload element. For example, instead of the spring 260 in FIG. 2B a thickened section of one of these materials may be placed along the internal surface 212. This section may also be pre-compressed during assembly. That is, by placing such material in a thicker and/or more compressed manner opposed to a target of compliant porous element to be preloaded (such as via the CMC transition), such section of material functions as and accordingly may be referred to as a preload element.

These various approaches are effective to provide a distributed load on the compliant porous element 240 that is restrained from an overload by a plurality of partially loadable protrusions 220. This preloading applies load onto a relatively large area of compliant porous element 240 and the protrusions 220 are extended and positioned to restrict an overload that may over-compress the compliant porous element 240, wherein such over-compression may detract from other functional characteristics of the compliant porous element 240, such as its ability to conduct a cooling air flow through itself.

Pins 255 are also shown in this exploded view. They function to attach the forward end of the transition body 230 to the forward end 206 of the shell 200. This attachment is more clearly depicted in FIGS. 2C and 2D. While pins 255 are shown in this exemplary embodiment, and in this position, it is appreciated that these pins are only one example of axial positioning devices that may be provided to establish a thermal growth zero point between the transition body and the metal shell at a selected location.

FIG. 2C provides a side view of the assembled transition 225 shown in an exploded view in FIG. 2B. The first part 202 and the second part 204 are secured together by a plurality of bolts 257 and nuts 259. Pins 255 extend through the external surface 210 of the shell 200 and also through the transition body 225 (see FIG. 2D).

FIG. 2D provides a cross-section view of the transition 225 taken along line D-D of FIG. 2C, however eliminating a middle section of the transition for purposes of illustration (the components also not being to scale). The compliant porous element 240 is positioned between the transition body 230 and the metal split shell 200. At a region 241 directly interior to a hard stop 220, there is a relatively thinner layer of the compliant porous element 240 (see also a region 241 in FIG. 2E having the relatively thinner layer). In various embodiments there may be such a thinner layer, or a lack, or an equivalently thick layer of the compliant porous element as in other regions lacking a hard stop 220. This may be determined based on the preloading and the operational requirements of the transition 225.

It is appreciated that for various embodiments, the positioning of the compliant porous element 240, and its thickness, is such that the compliant porous element constrains contact between a transition body and a lip.

Optional damping springs 270 also are viewable. These are considered a species of the individual spring elements discussed above. In the configuration shown, these may deflect and slide so as to damp vibrations. Damping springs may comprise a component of a compliant porous element such as wherein another component is ceramic felt filler in need of additional resilience upon preloading. In such embodiments, an average spring constant of the compliant porous element is derived from the sum of the spring constants of each of its components.

A single pin 255 is shown penetrating the external surface 210 of the shell 200, through the transition body 225, and into a lip 222. The pin 255 may be secured by any means known in the art, including welding and threading into the lip 222. Optional bushings (not shown) may be provided around the pin 255 in the region where it passes through the transition body 225 to help transfer vibrations and other loads.

A combustion chamber spring clip 282 is shown bearing against the lip 222 to establish a desired attachment as is known in the art. A bolt 257 also is shown passing through an aft flange 215 for attachment to the turbine forward end (not shown, see FIG. 2E).

One or more optional apertures 223 may be placed along a forward face 224 of the shell 200 in order to facilitate a cooling flow through the compliant porous element 240. Also viewable in FIG. 2D is that the transition body 225 comprises an optional ceramic insulating layer 265, bonded to the CMC-comprising structure 231, and the interior surface 266 of which defines a hot gas passage 280 (with arrow indicating direction of flow). With or without the optional ceramic insulating layer 266, the transition body 225, by its overall shape, defines the hot gas passage 280.

FIG. 2E provides an enlarged view of a cross-section of an aft end of a transition 225 embodiment of the present invention where it attaches to an integral end piece 284 of a turbine section. A bolt 257 passes through aft flange 215 and a flange 285 of the integral end piece 284 and is secured with a nut 259. In such embodiment a gap 252 is shown; this gap 252 both allows for passage of cooling fluid, such as from optional apertures 223 as shown in the shell 200, and also allows for differential thermal expansion of the metal and ceramic based elements. Cooling fluid, such as compressed air, passes through the apertures 223, the compliant porous element 240 and the gap 252 as shown. Also viewable is a hard stop type of protrusion 220, and the adjacent region 241 of relatively thinner compliant porous element 240.

Figure 3:
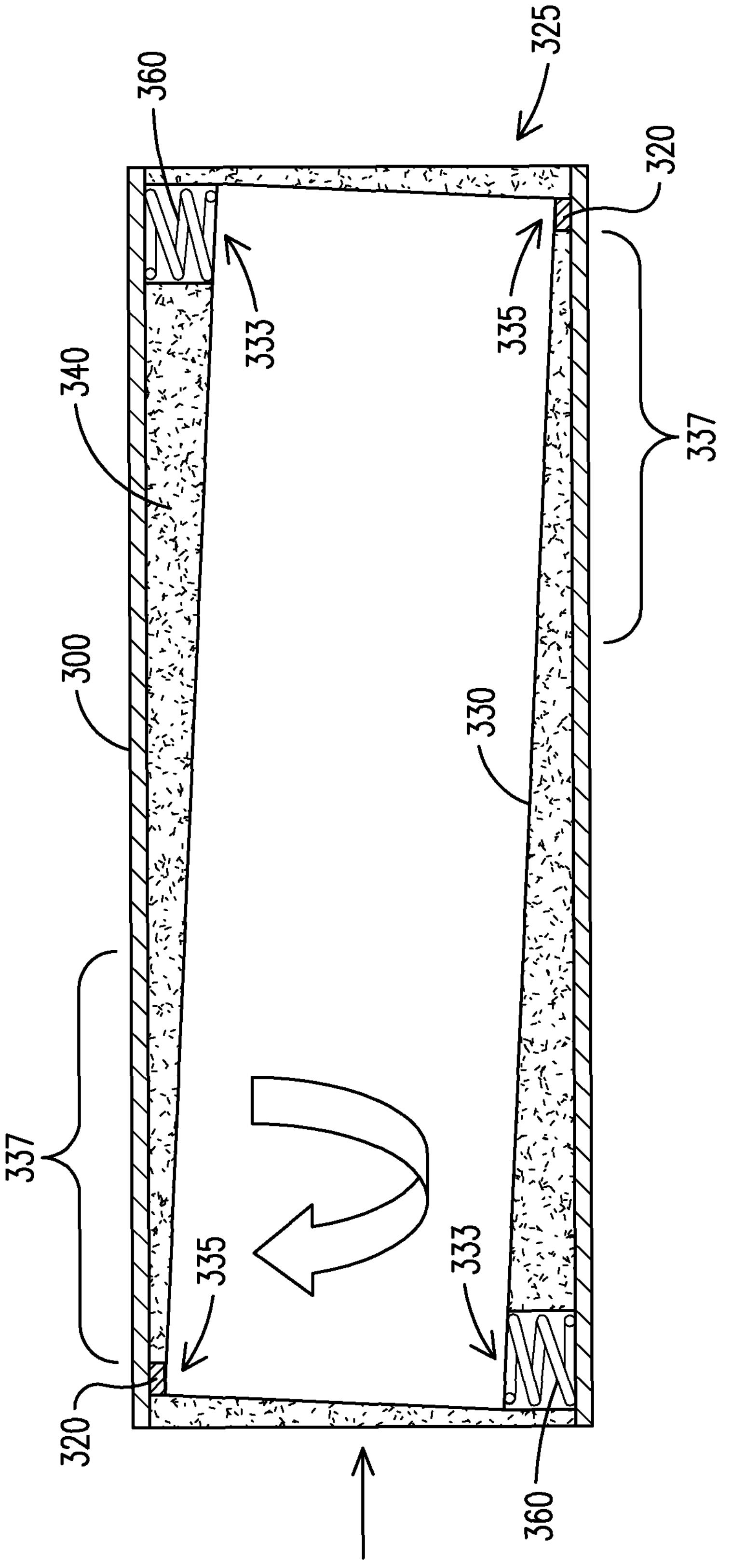
FIG. 3 is a side schematic view of a transition of the present invention showing how preloading may compensate for the torque from aerodynamic loads.

FIG. 3 is a side schematic cross-section depiction of a transition 325 of the present invention showing approaches as to how preloading elements may work together to compensate for the torque from aerodynamic loads. A transition body 330 comprising CMC is positioned within a metal shell 300 with a compliant porous element 340 there between (not shown in detail). In one approach, preload springs 360 preload the hard stop type protrusions 320 by pressing the transition body 330 against these particular hard stop protrusions 320 (whilst other protrusions, some of which may also be hard stops (not shown), may remain in a non-loaded position). Each preload spring 360 is positioned against a first region 333 of the transition body 330 and is adapted to urge the transition body 330 toward one of the at least one protrusion 320, positioned against a second region 335 generally opposite the first region 333. Also, each spring 360 preloads a relatively larger region 337 of the compliant porous element 340, which in this embodiment is adjacent one of the at least one protrusion 320. Thus, the compliant porous element 340 is preloaded, at least in some regions. The transition body 330 may comprise wear pads, thickened areas, or the like (not shown), at their points of contact with these protrusion/hard stops 320 as well as with one or more non-loaded protrusion/hard stops.

Figure 4A:
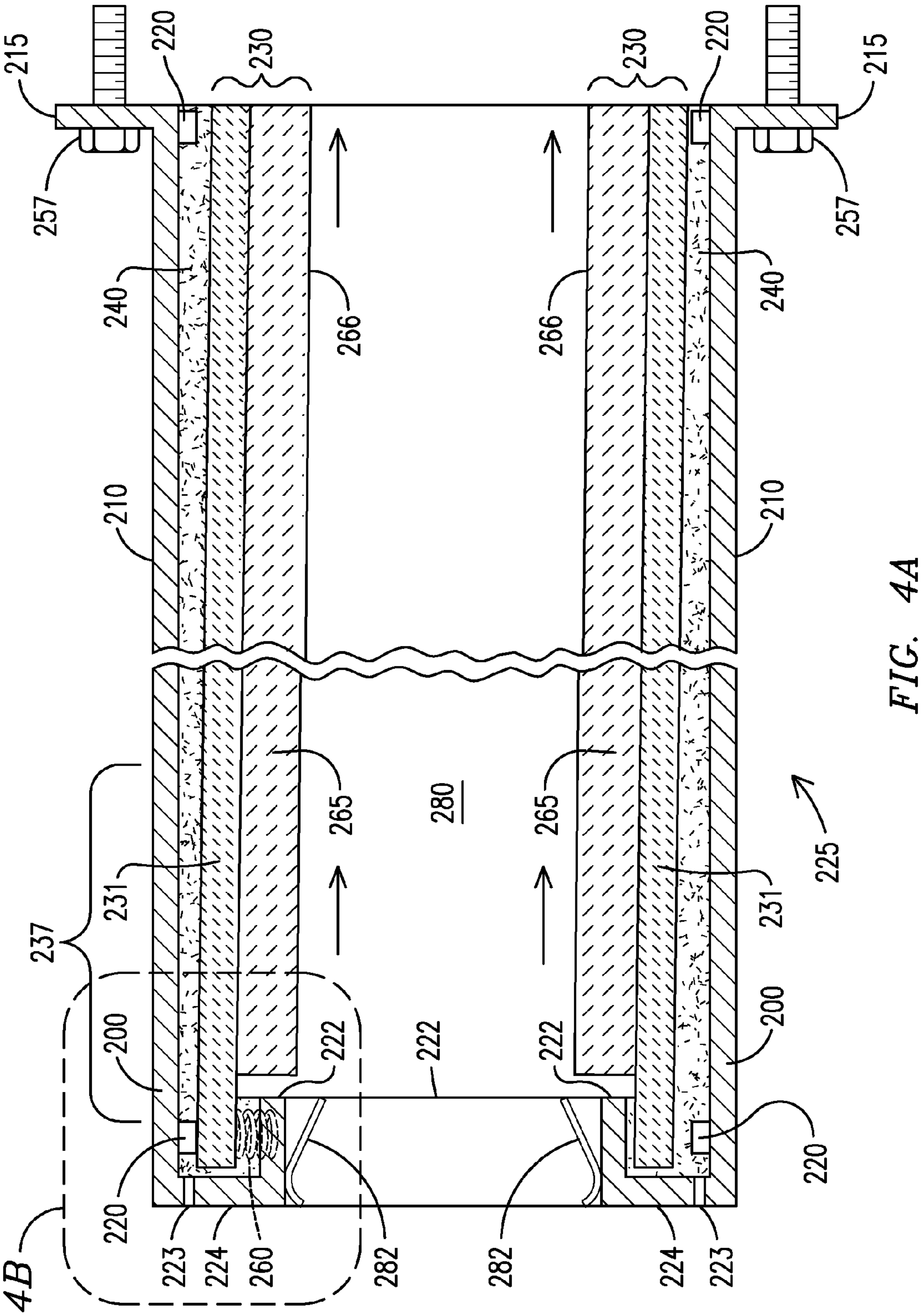
FIG. 4A is a partial cross-sectional view of a transition embodiment of the present invention demonstrating a particular location for a preload element.

A variation of this approach is to determine locations for one or more preload elements, such as springs, along the radially exterior surface of the lip, and provide such preload element(s) where preloading by such preload element(s) against one or more protrusions along the outer metal shell directly exterior to the lip region is effective to transfer the torque load, during operation, to the metal shell. This is shown in FIG. 4A, a partial cross-sectional drawing of a transition using component numbering previously described. Here preload spring 260 urges CMC-comprising component 231 toward a hard stop protrusion 220 (shown at the top left of the figure) to make contact during preloading and also preloads a region 237 of the compliant porous element 240 along the top forward portion of the transition 225. By such approach variation the transition body is not free to move even under the torque during operation. One or more of such protrusions 220 may be a hard stop.

Another variation, similar to the one immediately above, is to partially preload the transition 225 towards at least one protrusion 220, which may be a hard stop, wherein during operation that at least one protrusion 220 comes under load from the torque. That is, by only partially preloading the transition, when operations begin (optionally in part as a result of thermal expansion differences), the protrusion(s) that are designed to absorb the load of the noted torque become fully loaded by contact with the transition body. Such partial preloading allows the compliant member to share some of the torque load and distribute the load more uniformly along the transition body—thus preventing high local stresses in the transition body where it contacts the protrusion.

These approaches may find particular use for transitions that turn the hot gas and thereby experience a relatively higher torque compared with transitions that do not turn the hot gas. By such approach, for example, the transition body 330 of FIG. 3 can be seated against the metal shell 300 in the appropriate location(s) against hard stops and/or other protrusions (i.e., predetermined or determined after operational trials) so that the torque is transferred directly to the metal shell 300 either with or without an added transfer to the preloading springs 360 In various embodiments of such approach, even when the component is not loaded by the hot gas flow, the transition body 330 is not free to move around within the metal shell 300. As noted in the second variation, in certain embodiments a preloading spring may be positioned so as to preload the transition body at the inlet, from the metal lip inside the transition body. In other embodiments, the preloading of the transition body may be at a number of locations.

In some applications, the thermal expansion of the CMC transition member 225 may be greater than that of the metal support housing 210. In these cases, the relative thermal expansion may provide at least a portion of the preload by compressing the compliant porous element 240 and the springs 270.

Damping springs, such as double leaf springs, are helpful in high acoustic dynamic environments and are particularly helpful in cases where preload is minimal.

Preload elements are not necessarily springs which exist between the CMC transition body and the metal support housing. One alternative is to have springs (such as coil springs) on the outside (cold side) of the metal housing with a rod protruding through the metal housing and contacting the CMC transition body. Such an arrangement also allows for varying the preload by varying the pre-compression of the springs (e.g., by a threaded member). This arrangement also maintains the springs in the colder region of the component and expands the material choices.

Figure 4B:
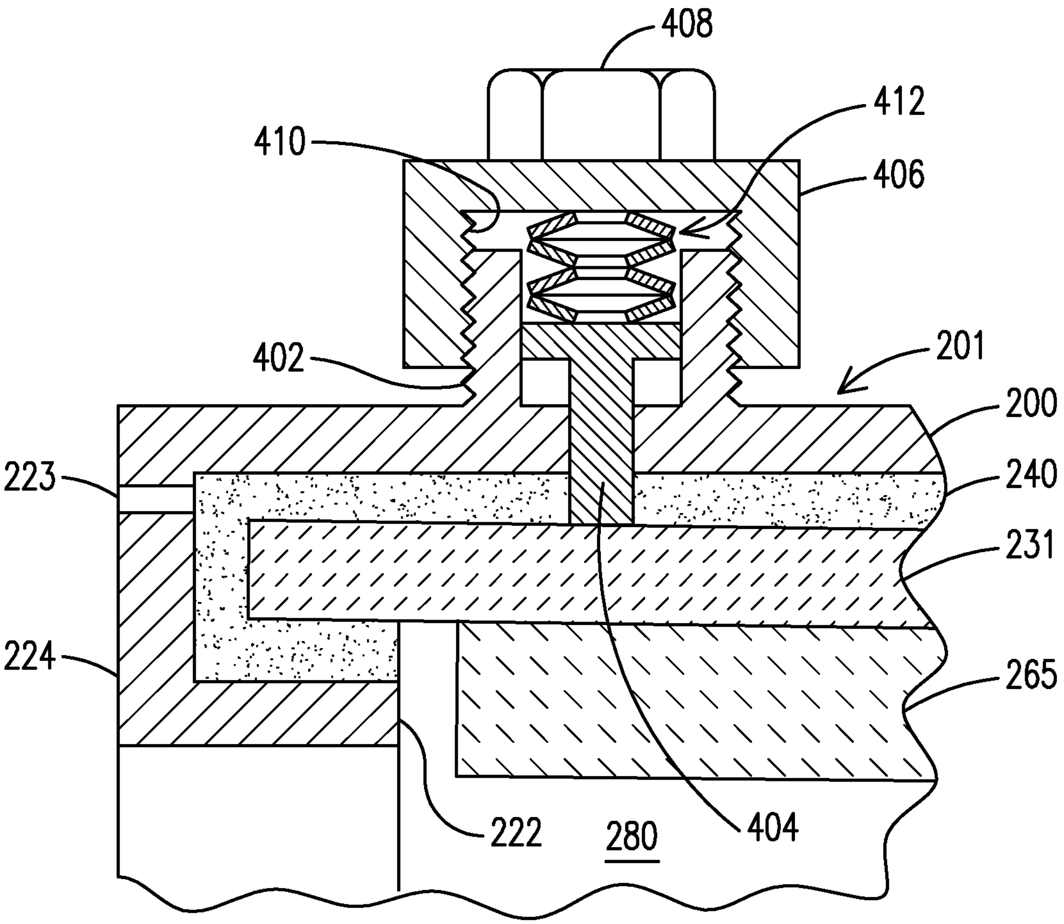
FIG. 4B provides a modified and enlarged view of a portion of FIG. 4A, depicting an alternative embodiment comprising an external spring that provides adjustable preload.

An exemplary embodiment of this external spring housing approach is provided in FIG. 4B, which uses some previously described component numbering. FIG. 4B is a modified and enlarged view of a portion of FIG. 4A indicated in dashed lines in FIG. 4A. FIG. 4B shows an alternative embodiment comprising an externally disposed spring assembly 412 that may be adjustably preloaded as described herein, rather than the more interiorly disposed preload spring 260 shown in FIG. 4A (and its adjacent hard stop protrusion 220, also lacking in FIG. 4B). In FIG. 4B is an externally threaded cylinder 402 which contains a plunger 404. This cylinder 402 extends externally from metal split shell 200 (i.e., on a side 201 that is opposite the side of the metal split shell 200 along which is the CMC-comprising component 231). An external spring housing 406 comprises an adjusting nut 408 and internal threads 410 that screw onto the externally threaded cylinder 402. The spring assembly 412, exemplified in FIG. 4B as Bellville washers (but more generally any type of spring), applies a spring force to the top of the plunger 404, which thereby preloads and urges CMC-comprising component 231. Adjustment using adjusting nut 408 increases or decreases the spring force upon the plunger 404 and consequently upon the CMC-comprising component 231. Also, as noted, the spring assembly 412 remains at a lower relative temperature given its more remote position from the hot gas passage 280.

Although the exemplary embodiment in FIG. 4B depicts the spring assembly and its housing as externally positioned relative to the hot gas passage 280 and the CMC-comprising component 231, in other embodiments (such as an inner liner of an annular combustion chamber), such approach, to further isolate the spring from elevated temperature, may result in the more remote position for the spring assembly and housing being more interior to the annular combustion chamber's wall. Thus, regardless of the orientation, to the inside or outside of a metal shell of the present invention, a spring assembly in a spring housing may be provided that is disposed on a side of the metal shell opposite the ceramic body, thereby benefiting from lower temperatures and an option of being adjustable as described herein.

In various embodiments the ceramic insulating layer is of a wearable type, such as those described in commonly assigned U.S. Pat. Nos. 6,013,592, 6,197,424, 6,235,370, and 6,287,511, which are incorporated by reference herein as to such teachings. In various embodiments, the ceramic insulating layer comprises a ceramic insulating material that is non-reinforced and has a heterogeneous microstructure.

Construction of apparatuses of the present invention may be accomplished by any methods known to those skilled in the art. Examples of construction methods, and of particular ceramic materials, are provided in the immediately above-cited patents and also in commonly assigned U.S. Pat. Nos. 6,733,907 and 7,093,359, which are incorporated by reference herein as to such teachings. Further to construction approaches, the components used in the present invention that comprise CMC may be manufactured in numerous ways that include, but are not limited to, the following four examples:

1. A ceramic insulating layer can be cast first and then ceramic fabric can be laid up on a surface of the ceramic insulating layer and processed into a CMC with the appropriate matrix, etc.

2. The CMC can be laid up in a mold to a desired specific shape. After it is fully fired, the ceramic insulating layer can be cast inside it.

3. The CMC can be fiber wound as a cylinder and then formed into a desired structure. The ceramic insulating layer can then be cast on the CMC.

4. The ceramic fiber can be woven as a three-dimensional structure, processed into a CMC structure having the desired structure, and the ceramic insulating layer can be cast inside the CMC thereafter.

5. The CMC can be formed by any of various methods and a low thermal conductivity-to-thickness ratio TBC can be plasma sprayed on the surface.

The above examples include the optional ceramic insulating layer, but this is not required, and other construction methods may be utilized lacking such optional layer. Also, as may be appreciated, some embodiments of the invention may have an axial positioning device, such as the depicted pins, at a position other than the forward end, or need not have an axial positioning device. Also, some embodiments need not have protrusions, but may instead by other means limit the preloading and the overall loading of the compliant porous element.

It is noted that transitions made according to the present invention may have a dampening effect on the vibrations driven by combustion dynamics, in terms of damping, transfer, direct damage, or any combination of these. CMCs are known to have good damping characteristics. In particular, oxide-based CMCs, which contain matrix micro cracks are highly internally damped. Combined with further dampening devices such as springs and compliant layers, the assembled component is resistant to typical acoustic forcing functions present in combustion environments.

The present invention is not limited to transitions, and for some embodiments the invention may be described as an apparatus comprising a liner comprising CMC, positioned inside a shell comprising a metal, with a compliant porous element there between and preloaded by urging the liner against the shell, and comprising at least one protrusion communicating with the shell that is not in contact with the liner under preload but that is positioned to transfer load during an operation of the apparatus. As to one class of such embodiments, these may be duct-shaped members such as ring segments, combustion chambers, transitions, and the like.

Other gas turbine components that could potentially benefit from this invention include combustor liners, interstage turbine ducts, exhaust ducts, and afterburner ducts. In addition, this present invention also applies to applications where the metal shell, as an internal member, supports an externally disposed ceramic body (for example a CMC inner liner for an annular combustor) where the aerodynamic pressures and thermal forces are transmitted from the ceramic body to the metal shell (which in such embodiments is positioned interior to the interior surface of the ceramic body, separated at least in part by a compliant porous element).

Also, as needed for a particular design any type of cooling approach known to those skilled in the art may be utilized in the various embodiments of the present invention. For example, U.S. Pat. No. 6,767,659 teaches coating a backside of a CMC composition with a high temperature emissive material and providing a metal element spaced apart from the CMC composition and defining a gap between the metal element and the ceramic matrix composite, whereby at least a portion of thermal energy exposed to the ceramic insulating material is emitted from the high temperature emissive material to the metal element. A cooling fluid may be made to flow by the backside of the metal element, thereby assisting in the cooling of the CMC composition. Accordingly, the teachings of U.S. Pat. No. 6,767,659 may be combined with the present invention by addition of an emissive coating, such as to the external surface of the CMC-comprising structure of a transition body. Film cooling or effusion cooling can also be used in various embodiments, either separately or in combination with other cooling techniques.

More generally, the present invention may be combined with other approaches to the use of ceramic structures and components for gas turbines and for other devices that are subject to exposure to high temperatures.

All patents, patent applications, patent publications, and other publications referenced herein are hereby incorporated by reference in this application in order to more fully describe the state of the art to which the present invention pertains, to provide such teachings as are generally known to those skilled in the art, and to provide such teachings as are noted through references herein.

While various embodiments of the present invention have been shown and described herein, it will be obvious that such embodiments are provided by way of example only. Numerous variations, changes and substitutions may be made without departing from the invention herein. Moreover, when any range is understood to disclose all values therein and all sub-ranges therein, including any sub-range between any two numerical values within the range, including the endpoints. Accordingly, it is intended that the invention be limited only by the spirit and scope of the appended claims.

The invention claimed is:

1. An apparatus comprising:

a ceramic body defining a hot gas path through its length;

a metal shell surrounding the ceramic body along its length and defining a space there between along the length, the metal shell comprising a plurality of load-limiting protrusions extending into the space toward the ceramic body;

a compliant porous element surrounding the ceramic body within the space, wherein the compliant porous element is selected from a group consisting of felt metal, metal fiber pad, ceramic felt filler, and any combination of these; and a preload element in an urging orientation with the ceramic body, wherein the preload element urges the ceramic body toward the metal shell to preload the compliant porous element, and wherein at least one of the load-limiting protrusions is not in contact with the ceramic body under preload but is positioned to make contact during an operation of loading the apparatus;

additionally comprising a plurality of damping springs disposed along a length of the space between the metal shell and the ceramic body.

2. An apparatus comprising:

a ceramic body defining a hot gas path through its length;

a metal shell surrounding the ceramic body along its length and defining a space there between along the length, the metal shell comprising a plurality of load-limiting protrusions extending into the space toward the ceramic body;

a compliant porous element surrounding the ceramic body within the space, wherein the compliant porous element is selected from a group consisting of felt metal, metal fiber pad, ceramic felt filler, and any combination of these; and a preload element in an urging orientation with the ceramic body, wherein the preload element urges the ceramic body toward the metal shell to preload the compliant porous element, and wherein at least one of the load-limiting protrusions is not in contact with the ceramic body under preload but is positioned to make contact during an operation of loading the apparatus;

wherein the metal shell comprises two or more pieces adapted to fit together.

3. An apparatus comprising:

a ceramic body defining a hot gas path through its length;

a metal shell surrounding the ceramic body along its length and defining a space there between along the length, the metal shell comprising a plurality of load-limiting protrusions extending into the space toward the ceramic body;

a compliant porous element surrounding the ceramic body within the space, wherein the compliant porous element is selected from a group consisting of felt metal, metal fiber pad, ceramic felt filler, and any combination of these; and a preload element in an urging orientation with the ceramic body, wherein the preload element urges the ceramic body toward the metal shell to preload the compliant porous element, and wherein at least one of the load-limiting protrusions is not in contact with the ceramic body under preload but is positioned to make contact during an operation of loading the apparatus;

wherein the preload element comprises a compressed section of a material selected from the group consisting of felt metal, metal fiber pad, knitted wire material springs, and ceramic felt filler.

4. An apparatus comprising:

a ceramic body defining a hot gas path through its length;

a metal shell surrounding the ceramic body along its length and defining a space there between along the length, the metal shell comprising a plurality of load-limiting protrusions extending into the space toward the ceramic body;

a compliant porous element surrounding the ceramic body within the space, wherein the compliant porous element is selected from a group consisting of felt metal, metal fiber pad, ceramic felt filler, and any combination of these; and a preload element in an urging orientation with the ceramic body, wherein the preload element urges the ceramic body toward the metal shell to preload the compliant porous element, and wherein at least one of the load-limiting protrusions is not in contact with the ceramic body under preload but is positioned to make contact during an operation of loading the apparatus;

wherein at least one of the load-limiting protrusions is in contact with the ceramic body under preload.

5. An apparatus comprising:

a ceramic body defining a hot gas path through its length;

a metal shell surrounding the ceramic body along its length and defining a space there between along the length, the metal shell comprising a plurality of load-limiting protrusions extending into the space toward the ceramic body;

a compliant porous element surrounding the ceramic body within the space, wherein the compliant porous element is selected from a group consisting of felt metal, metal fiber pad, ceramic felt filler, and any combination of these; and a preload element in an urging orientation with the ceramic body, wherein the preload element urges the ceramic body toward the metal shell to preload the compliant porous element, and wherein at least one of the load-limiting protrusions is not in contact with the ceramic body under preload but is positioned to make contact during an operation of loading the apparatus;

the metal shell comprising a plurality of cooling apertures in fluid communication with the compliant porous element.

6. An apparatus comprising:

a ceramic body defining a hot gas path through its length;

a metal shell surrounding the ceramic body along its length and defining a space there between along the length, the metal shell comprising a plurality of load-limiting protrusions extending into the space toward the ceramic body;

a compliant porous element surrounding the ceramic body within the space, wherein the compliant porous element is selected from a group consisting of felt metal, metal fiber pad, ceramic felt filler, and any combination of these; and a preload element in an urging orientation with the ceramic body, wherein the preload element urges the ceramic body toward the metal shell to preload the compliant porous element, and wherein at least one of the load-limiting protrusions is not in contact with the ceramic body under preload but is positioned to make contact during an operation of loading the apparatus;

wherein the preload element comprises a spring assembly in a spring housing disposed on a side of the metal shell opposite the ceramic body.

7. The apparatus of claim 6, wherein the preload element further comprises:

an externally threaded cylinder attached to the metal shell, the spring housing threaded onto the cylinder and the spring assembly disposed within the cylinder and in contact with the spring housing;

a plunger disposed within the cylinder in contact with the spring assembly and extending through an opening in the metal shell to make contact with the ceramic body;

wherein adjustment of an extent of threading of the spring housing onto the cylinder increases or decreases a spring force exerted on the plunger and the ceramic body.

8. An apparatus comprising:

a ceramic body defining a hot gas path through its length;

a metal shell surrounding the ceramic body along its length and defining a space there between along the length, the metal shell comprising a plurality of load-limiting protrusions extending into the space toward the ceramic body;

a compliant porous element surrounding the ceramic body within the space, wherein the compliant porous element is selected from a group consisting of felt metal, metal fiber pad, ceramic felt filler, and any combination of these; and a preload element in an urging orientation with the ceramic body, wherein the preload element urges the ceramic body toward the metal shell to preload the compliant porous element, and wherein at least one of the load-limiting protrusions is not in contact with the ceramic body under preload but is positioned to make contact during an operation of loading the apparatus;

further comprising:

a cooling aperture formed in the metal shell to permit fluid communication of a cooling air flow through the compliant porous element;

wherein the plurality of load-limiting protrusions are positioned to be effective to restrict an over-compression of the compliant porous element which would detract from its ability to conduct the cooling air flow.

* * * * *